US011859790B2

(12) United States Patent
Fraizer et al.

(10) Patent No.: US 11,859,790 B2
(45) Date of Patent: Jan. 2, 2024

(54) AUTOMOTIVE LIGHTING

(71) Applicant: Valeo North America, Inc., Troy, MI (US)

(72) Inventors: Robert Leon Fraizer, Seymour, IN (US); Rebecca Stanley, Seymour, IN (US); Shivi Singh, Seymour, IN (US); Colby J. Darlage, Seymour, IN (US); Jose Alberto Gomez Ramirez, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 16 days.

(21) Appl. No.: 17/385,960

(22) Filed: Jul. 27, 2021

(65) Prior Publication Data

US 2021/0356093 A1    Nov. 18, 2021

Related U.S. Application Data

(63) Continuation of application No. 16/591,146, filed on Oct. 2, 2019, now Pat. No. 11,079,089.

(51) Int. Cl.

| | |
|---|---|
| ***F21S 43/20*** | (2018.01) |
| ***F21S 43/239*** | (2018.01) |
| ***F21S 43/243*** | (2018.01) |
| ***F21S 43/31*** | (2018.01) |
| ***F21S 43/40*** | (2018.01) |
| ***F21S 43/249*** | (2018.01) |
| ***F21S 43/14*** | (2018.01) |
| ***F21Y 115/10*** | (2016.01) |

(52) U.S. Cl.

CPC .......... *F21S 43/255* (2018.01); *F21S 43/239* (2018.01); *F21S 43/243* (2018.01); *F21S 43/249* (2018.01); *F21S 43/26* (2018.01); *F21S 43/31* (2018.01); *F21S 43/40* (2018.01); *F21S 43/14* (2018.01); *F21Y 2115/10* (2016.08)

(58) Field of Classification Search

CPC . F21S 43/235; F21V 9/08; F21V 9/00; G02B 6/0041; G02B 1/045

See application file for complete search history.

(56) References Cited

U.S. PATENT DOCUMENTS

| | | | | |
|---|---|---|---|---|
| 5,184,883 | A | 2/1993 | Finch et al. | |
| 5,590,945 | A | 1/1997 | Simms | |
| 6,099,156 | A | 8/2000 | Jenkins et al. | |
| 6,761,475 | B2 | 7/2004 | Perlo et al. | |
| 6,955,459 | B2 * | 10/2005 | Mochizuki | F21S 43/237 362/540 |
| 7,401,947 | B2 | 7/2008 | Wanninger et al. | |
| 7,988,318 | B1 | 9/2011 | Smith et al. | |
| 8,292,487 | B2 | 10/2012 | Conzatti et al. | |
| 9,328,898 | B1 | 5/2016 | Flasck | |

(Continued)

*Primary Examiner* — Arman B Fallahkhair

(74) *Attorney, Agent, or Firm* — Valeo North America, Inc.

(57) ABSTRACT

A light guide has an elongated body that includes an entrance face at which light is admitted into the light guide and an exit face at which the light emanates from the light guide. The light guide has an inboard side wall and an outboard side wall extending between the entrance face and the exit face. The entrance face, the exit face, the inboard side wall and the outboard side wall enclose a medium containing a colorant by which the medium meets a color criterion while minimizing light absorption at a wavelength of the light.

20 Claims, 8 Drawing Sheets

(56) References Cited

U.S. PATENT DOCUMENTS

| | | | | |
|---|---|---|---|---|
| 9,599,308 | B2 * | 3/2017 | Ender | F21S 43/239 |
| 9,632,035 | B2 | 4/2017 | Brukilacchio | |
| 10,155,472 | B1 | 12/2018 | Miller | |
| 10,222,530 | B2 | 3/2019 | Schiccheri et al. | |
| 10,730,430 | B2 | 8/2020 | Williams et al. | |
| 2003/0193815 | A1 * | 10/2003 | Mishimagi | B60Q 1/2665 362/494 |
| 2007/0195420 | A1 * | 8/2007 | Fitchmun | G02C 7/104 359/603 |
| 2019/0032884 | A1 | 1/2019 | Martus | |
| 2019/0093853 | A1 * | 3/2019 | Park | F21S 41/141 |
| 2019/0137052 | A1 * | 5/2019 | Hwang | F21V 7/0083 |

* cited by examiner

310

320

AUTOMOTIVE LIGHTING

CROSS-REFERENCE TO RELATED APPLICATIONS

This application is a continuation of U.S. application Ser. No. 16/591,146 filed Oct. 2, 2019 (now published US2021/0102682), the disclosure of which is hereby incorporated in its entirety by reference herein.

TECHNICAL FIELD

The present disclosure relates to automotive lighting systems, and in particular to optical elements in automotive lighting systems.

In today's automotive industry, lighting systems need to provide not only certain levels of visibility, but also aesthetic appeal to consumers. Notably, due to customer popularity and stylistic identification with certain automotive manufacturers or models, some lighting systems need to provide a light blade. As used herein, a light blade is a light guide that produces an elongated lighting profile. One such light blade is disclosed in U.S. application Ser. No. 15/664,915, filed on Jul. 31, 2017 (now published US2019/0032884), entitled "Light Guide for Automotive Lighting." This application has a common inventorship and describes the optical characteristics and light guide mountings that can be used in conjunction with present embodiments. U.S. application Ser. No. 15/664,915 is hereby incorporated herein in its entirety.

A light blade generally provides a long, seamless, sleek appearance in an unlit state. However, maintaining such an appearance in the lit state can make qualifying the stringent automotive photometric requirements (such as those defined in Federal Motor Vehicle Safety Standard (FMVSS) No. 108) challenging. Engineering and design efforts to meet automotive photometric requirements in a light blade are ongoing.

SUMMARY

The present inventive concept advances the current state of the art. A light guide has an elongated body that includes an entrance face at which light is admitted into the light guide and an exit face at which the light emanates from the light guide. The light guide has an inboard side wall and an outboard side wall extending between the entrance face and the exit face. The entrance face, the exit face, the inboard sidewall and the outboard side wall enclose a medium containing a colorant by which the medium meets a color criterion while being minimally absorptive at a wavelength of the light.

DETAILED DESCRIPTION

Figure 1:
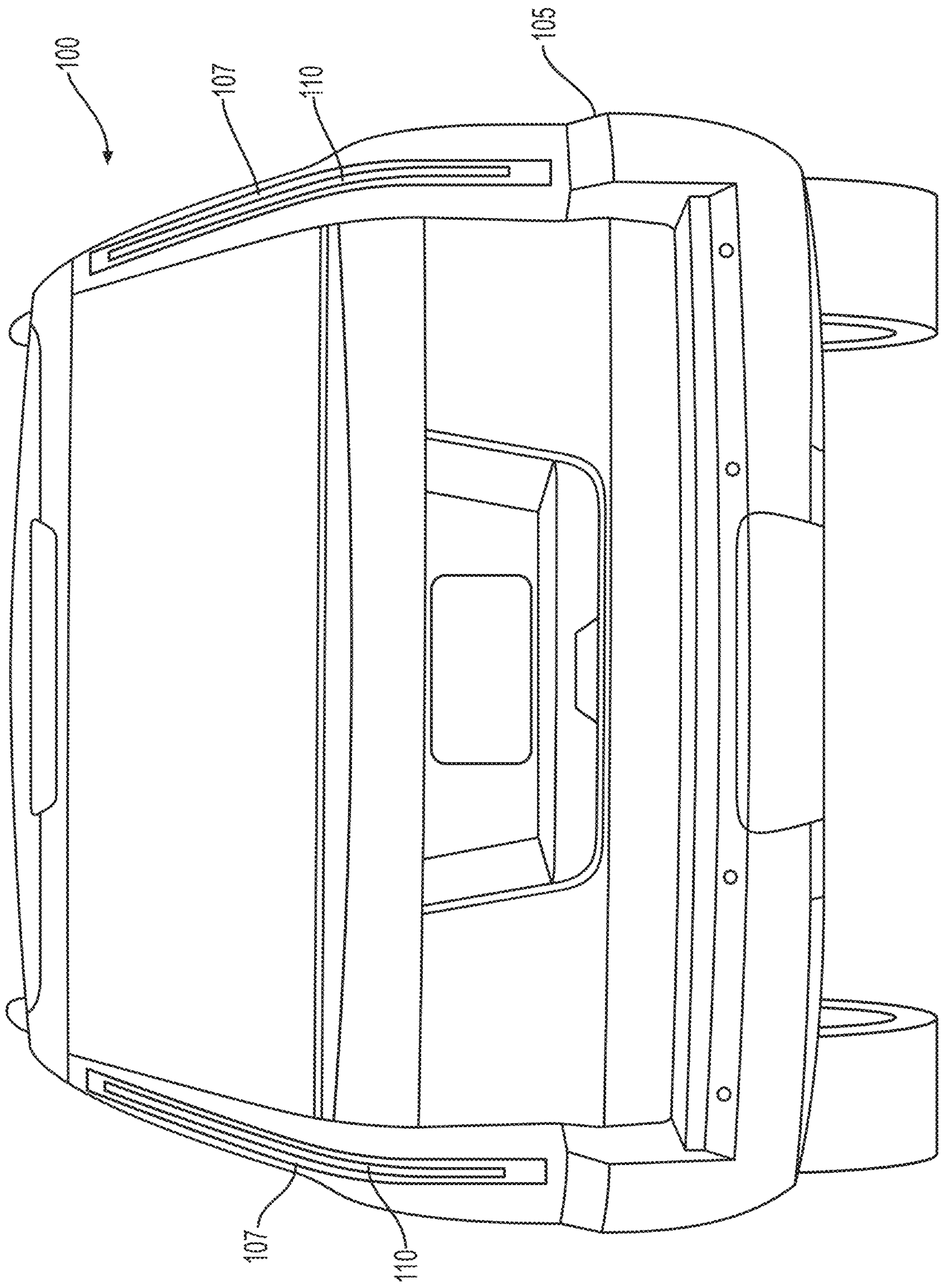
FIG. 1 is an illustration of automotive rear lighting by which the present inventive concept can be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

FIG. 1 is an illustration of a vehicle 100 in which the present invention can be embodied. As illustrated in the figure, vehicle 100 includes a rear lighting assembly 107 used for stop/tail automotive lighting functions and mounted in vehicle body 105. The present invention can be realized to emit essentially any color, however, automotive embodiments will typically employ clear, amber or red light guide media. In this disclosure, rear lighting assembly 107, which performs redtail/stop functions using a light blade, will exemplify typical embodiments. However, lighting functions other than those described herein can be realized by embodiments of the invention, as the skilled artisan will attest upon review of this disclosure.

Figure 2A:
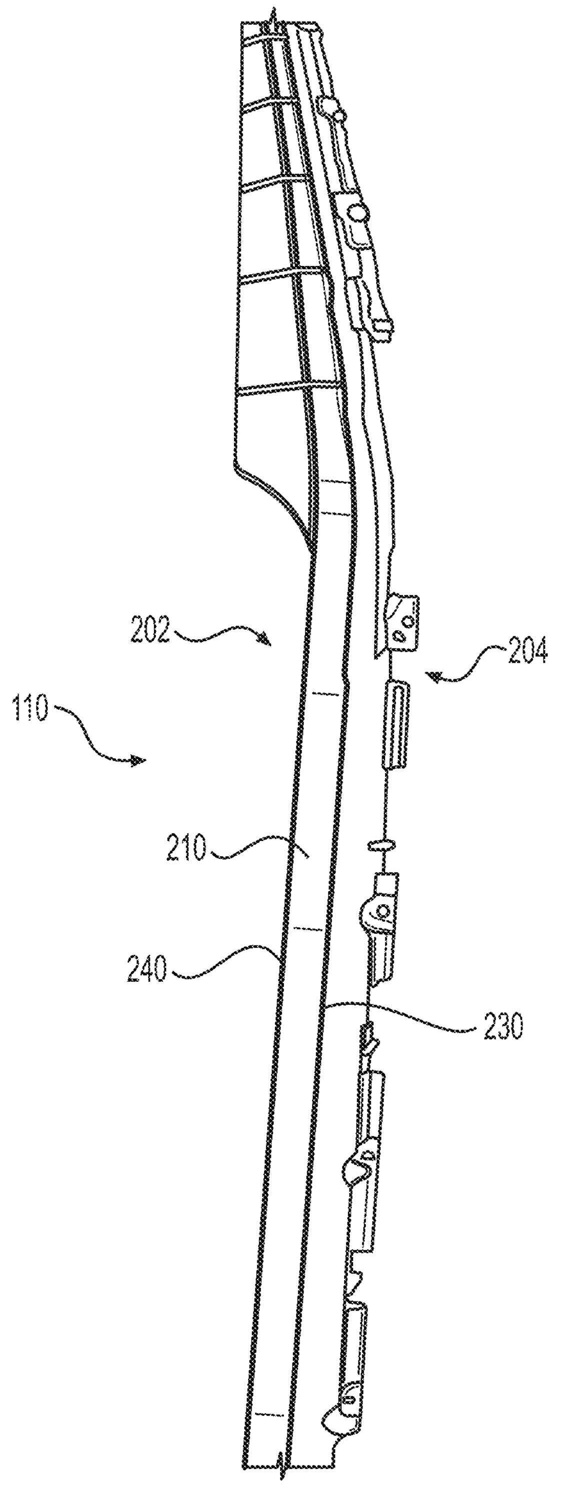
FIG. 2A and FIG. 2B are illustrations of front and side view of alight guide with which the present inventive concept can be embodied.
Figure 2B:
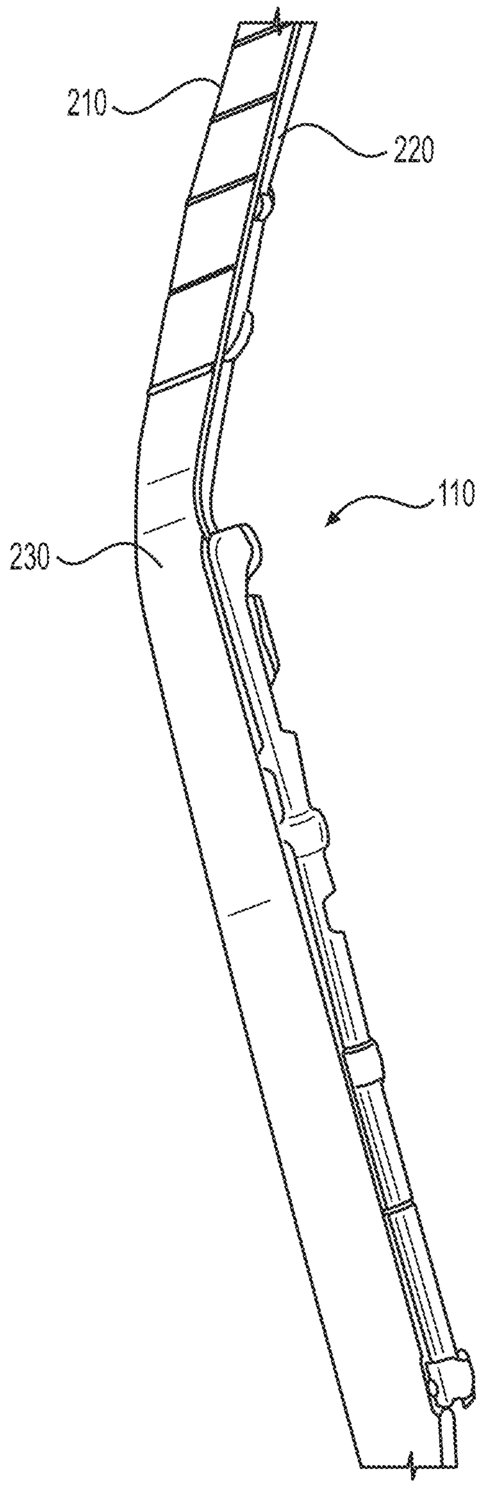

Rear lighting assembly 107 includes at least one light guide 110 in the form of a light blade, an example of which is illustrated in FIGS. 2A-2B, collectively referred to herein as FIG. 2. FIG. 2A is an illustration of the front, light emitting side of light guide 110 and FIG. 2B is an illustration of a side view of light guide 110. Light guide 110 will be described herein as having an inboard side 202, corresponding to the inboard direction of vehicle 100, and an outboard side 204, corresponding to the outboard direction of vehicle 100. In certain embodiments, light guide 110 can be made relatively thick, e.g., 40-50 mm corresponding to an increased light path length as compared to traditional designs.

Exemplary light guide 110 includes an exit face 210 from which light, provided by a light source at entrance face 220, is emitted to meet a lighting profile criterion. Such lighting profile may specify homogeneous lighting across exit face 210 at intensity levels that meet certain photometric specifications, such as the exterior automotive lighting requirements of FMVSS No. 108. As used herein, "homogenous lighting" refers to a lighting profile over which the intensity of light is evenly distributed over exit face 210 when light guide 110 is illuminated by a set of evenly spaced light sources, as described below. Such homogeneous lighting avoids abrupt changes or gaps in the lighting profile to the extent that individual light sources may be indiscernible at exit face 210. However, it is to be understood that non-homogeneous effects are possible by changing the illumination by the light sources. Such homogeneity may be achieved by various features described herein including the aforementioned increased light guide thickness.

Light guide 110 may include side walls—inboard side wall 240 and outboard side wall 230—that extend between exit face 210 and entrance face 220. Exit face 210, entrance face 220, outboard side wall 230 and inboard side wall 240 enclose a light guide medium, e.g., a polymer such as polycarbonate that has a refractive index relative to air that results in light being totally reflected internally at the outboard side wall 230 and the inboard side wall 240. The present invention is not limited to particular refractive indexes so long as the total internal reflection is realized.

In certain embodiments of the present invention, the light guide medium may be tuned to a light source with which it is illuminated. The term "tune," as used herein, refers to optimizing the transmittance efficiency (minimizing the absorbance) of the medium at the wavelength of light emitted by the light source under the constraint that the color of light guide medium must meet a predetermined color criterion, e.g., must fall within Society of Automotive Engineers (SAE) and/or Economic Commission for Europe (ECE) color space for a given automotive lighting function. As a first measure for optimizing transmittance efficiency, a base polycarbonate of high clarity may be utilized. e.g., a polycarbonate exhibiting approximately 90% transmittance through 4 mm of the material. A colorant (a dye, pigment, etc.) may be added to the base polycarbonate by which the actual tuning is achieved. Attenuation of light through a medium follows the Beer-Lambert law A=.sub..lamda.lc, where .sub..lamda. is the wavelength-dependent molar extinction coefficient of the attenuating species, 1 is the optical path length over which the light travels through the medium and c is the concentration of the attenuating species. To tune the medium to the light source in accordance with the present invention, a colorant may be selected that has a minimum molar extinction coefficient .sub..lamda. (as compared to other colorants that can be used to meet the color criterion) at the light source wavelength (e.g., 645 nm) while meeting the color requirements stipulated by a photometric specification (e.g., red that is within SAE and/or ECE color space). The selected colorant may be added to the base polycarbonate at a concentration that is no more than sufficient to achieve the specified hue.

Empirical techniques may also be used to tune the light blade medium to a particular light source. Once the thickness (e.g., 40-50 mm) and shape of the targeted light blade has been established and the emission wavelength (e.g., .about.645 nm) of a light source has been chosen, color values may be determined with which the light blade medium meets a color criterion, e.g., falls within a specified color space for a legal automotive lighting function. The color values may be specified as coordinates or samples in a wide variety of color spaces; for purposes of description and not limitation, L*a*b* color values are used herein. In certain embodiments, the color values must meet the color criterion to within a certain tolerance, e.g., less than or equal to a Delta E of 2, where Delta E is a calculated number representing the total difference in color between 2 samples. A Delta E of 2 or less is equivalent to limits of the human eye at distinguishing different colors. As one non-limiting example, color values of L*=32.24, a*=67.91, b*=55.47@18.5 mm material thickness defines a red color that meets SAE and ECE color criteria for an automotive stop function.

Once the color of the light source and the light guide medium have been established, colorants and base materials may be selected that realize the maximum transmission at the defined light source wavelength (e.g., 645 nm). One example colored material realizing the present invention exhibits maximum transmission from 580 nm to 740 nm, which is .about.80% @ 18.5 mm thickness.

Light guide 110 may be molded into a single formation, such as that illustrated in FIGS. 2A and 2B. In addition to the high clarity discussed above, the base polycarbonate may be a high flow polymer, e.g., having a melt flow index (MFI) of 25-34 g/10 min. When so embodied, fine details of the part can be formed in an injection molding or similar polymer forming process. However, it is to be understood that such single formation may be realized by more than one pass of a molding or similar process, as will be discussed further below.

Figure 3A:
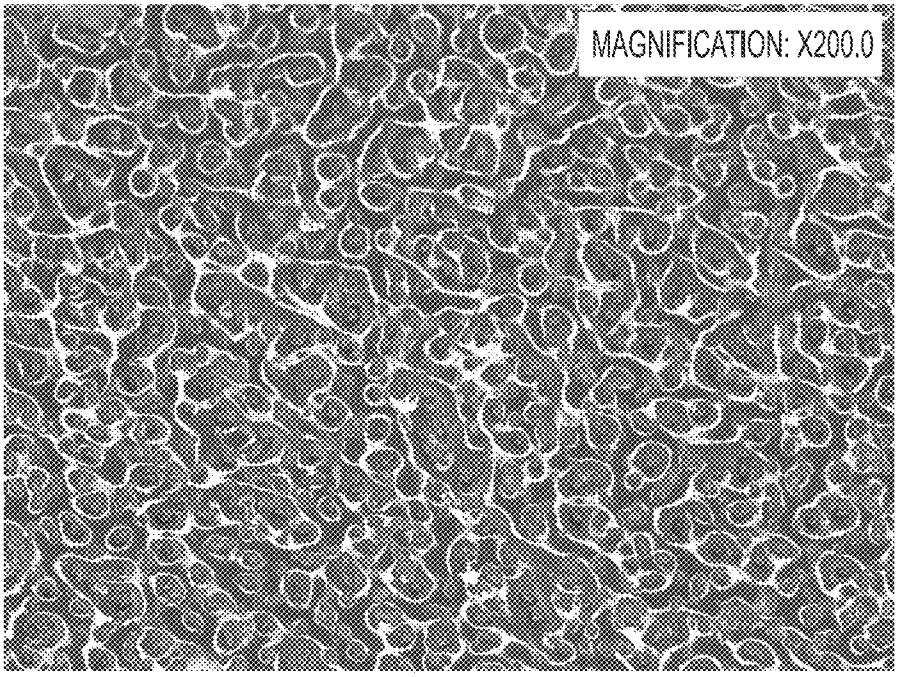
FIG. 3A and FIG. 3B are illustrations of micro-texturing with which the present inventive concept can be embodied.
Figure 3B:
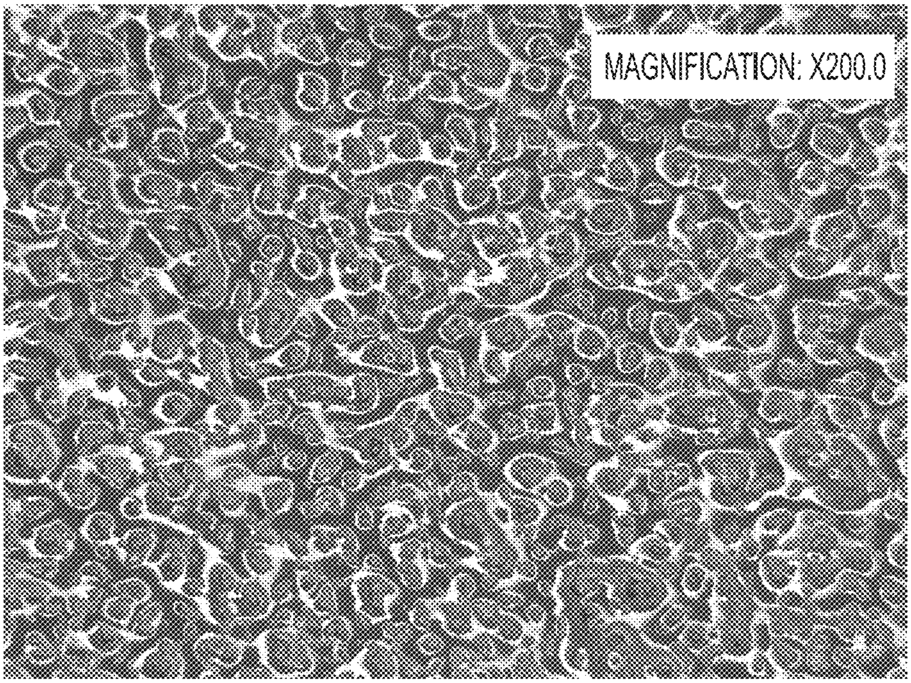

FIGS. 3A-3B, collectively referred to herein as FIG. 3, illustrate example fine details that can be used in embodiments of the invention. In certain embodiments, exit face 210 may have a micro-texture 310 illustrated in FIG. 3A while entrance face 220 may have a micro-texture 320 illustrated in FIG. 3B formed thereon. In one embodiment, micro-texture 310 has a texture depth of 0.001 inch and a draft angle of 1.5.degree. Here, "draft angle" refers to the amount of taper for molded or cast parts perpendicular to the mold parting line. The present invention is not limited to particular micro-texture sizing, but in certain embodiments, the micro-texture 310 formed on exit face 210 is finer than micro-texture 320 formed on entrance face 220.

In certain embodiments, laser light is applied to micro-texture 310 and micro-texture 320 to produce a laser haze across exit face 210 and entrance face 220, respectively. Such laser light application slightly distorts the micro-texturing. Micro-texturing and laser hazing of exit face 210 and entrance face 220 provides light scattering centers on both surfaces, by which a more homogeneous lighting profile, as viewed by an observer, is produced.

Figure 4:
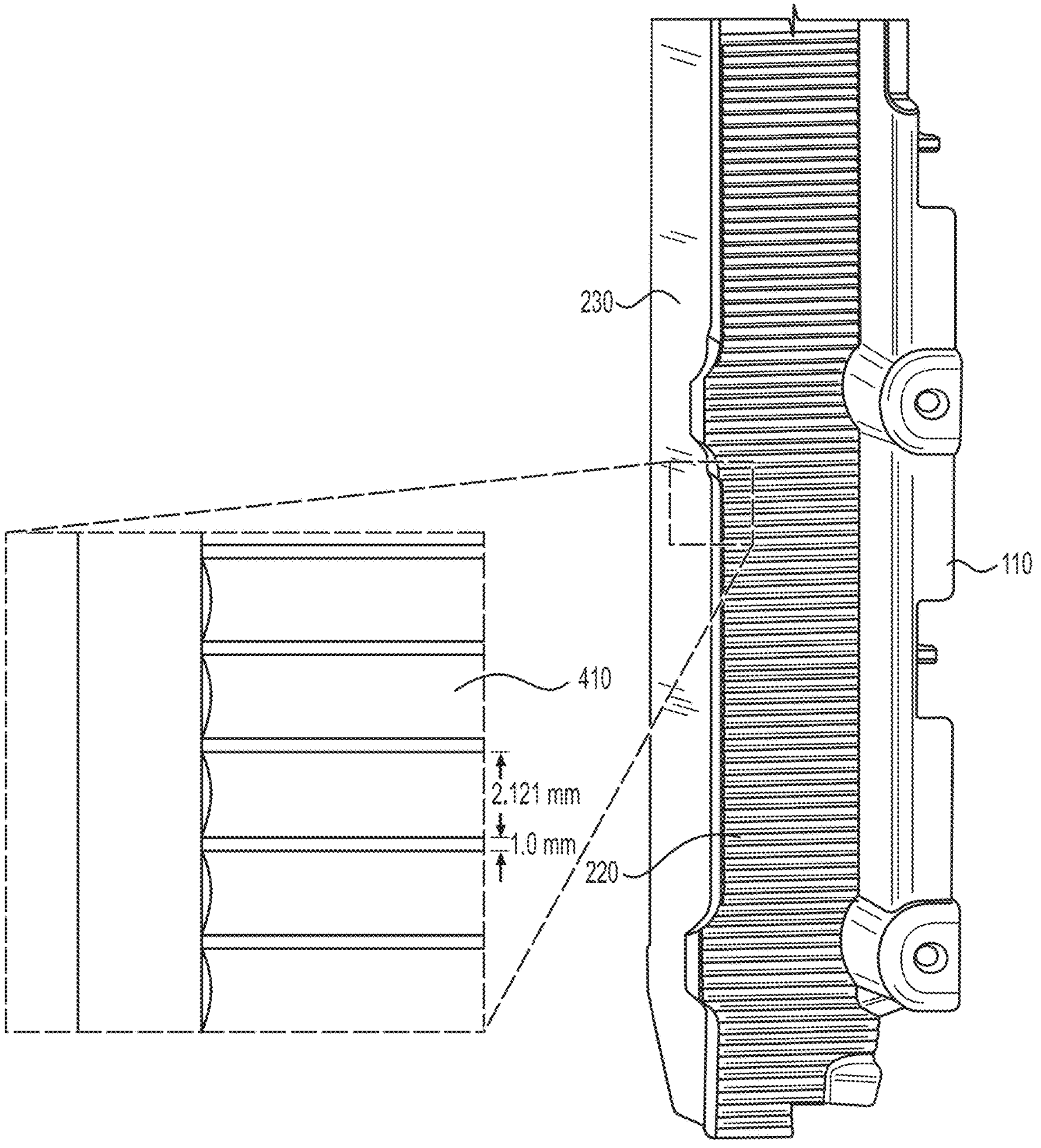
FIG. 4 is an illustration of a light guide entrance face by which the present inventive concept can be embodied.

FIG. 4 is an illustration of an entrance face 220 of an embodiment of the present invention. As illustrated in the figure, entrance face 220 may have formed thereon semi-cylindrical protuberances 410 that act to spread the light incident thereon across the width of light guide 110. In certain embodiments, protuberances 410 are approximately 2.0 mm wide and have a 0.3 mm radius of curvature. Protuberances 410 may be spaced apart at a 1.0 mm pitch.

Figure 5:
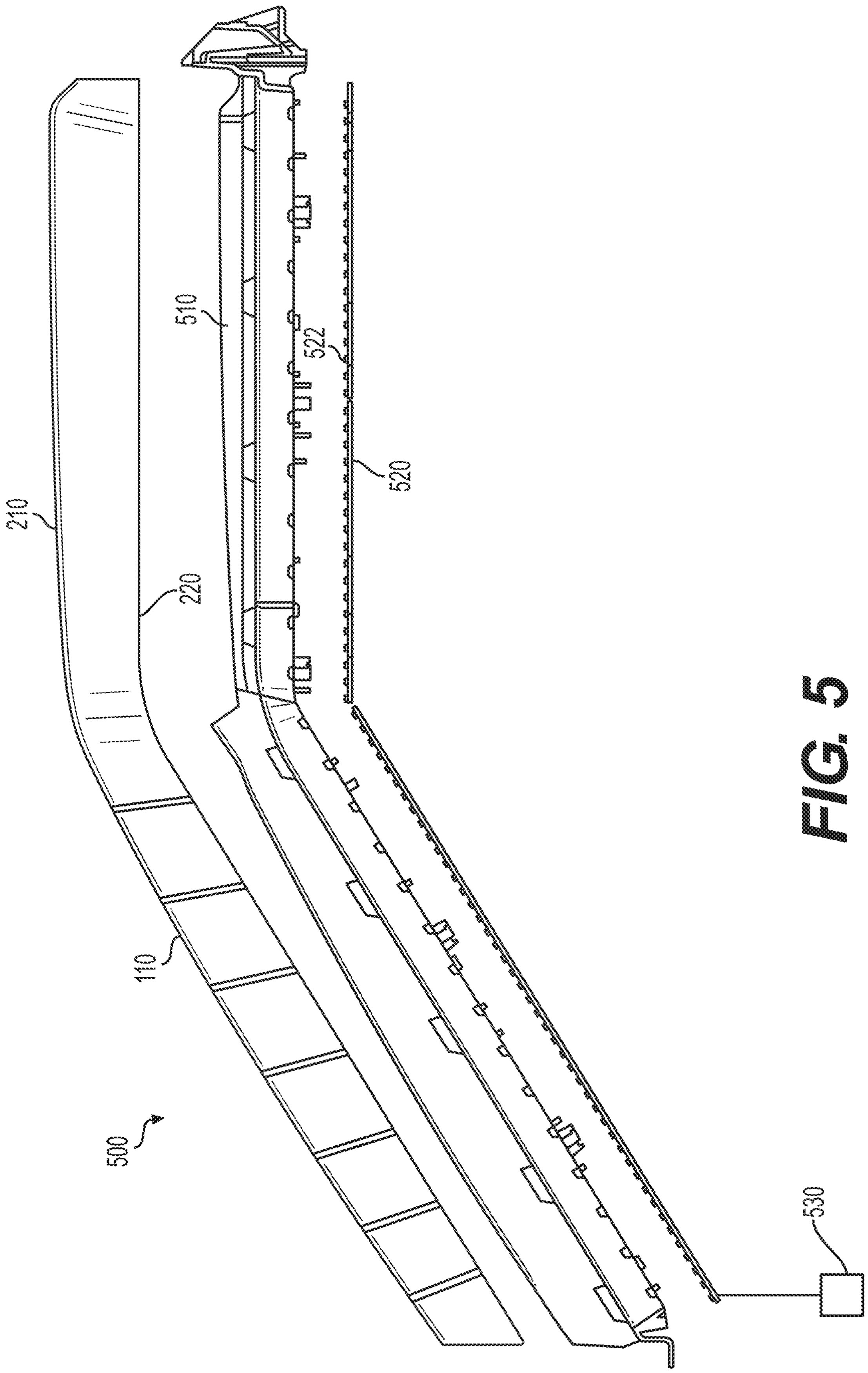
FIG. 5 is an exploded view of a lighting apparatus by which the present inventive concept can be embodied.

FIG. 5 is an exploded view of an example rear lighting assembly 500 by which the present invention can be embodied. Lighting apparatus 500 may include a light guide 110, a reflector unit 510 and a light source unit 520 assembled together by suitable connection mechanisms, e.g., adhesives, screws, snap-fit connectors molded in connecting parts, etc. Lighting apparatus 500 is responsive to an electrical signal (LED drive current) provided through, for example, a connector 530, to produce a homogeneous lighting profile at the exit face thereof.

Light source unit 520 can be configured to provide light that is incident on light guide 110, particularly at entrance face 220. Light source 520 can include a plurality of individual solid state light sources 522, e.g. light emitting diodes (LEDs), which may be implemented by organic light emitting diodes (OLEDs), polymer light emitting diodes (PLEDs), and/or monolithic LEDs, positioned along the longitudinal direction of the light guide. In certain embodiments, individual LEDs 522 have an active area of 0.04 cm.sup.2, are separated on 10 mm centers and generate red light (for stop and tail functions).

Figure 6:
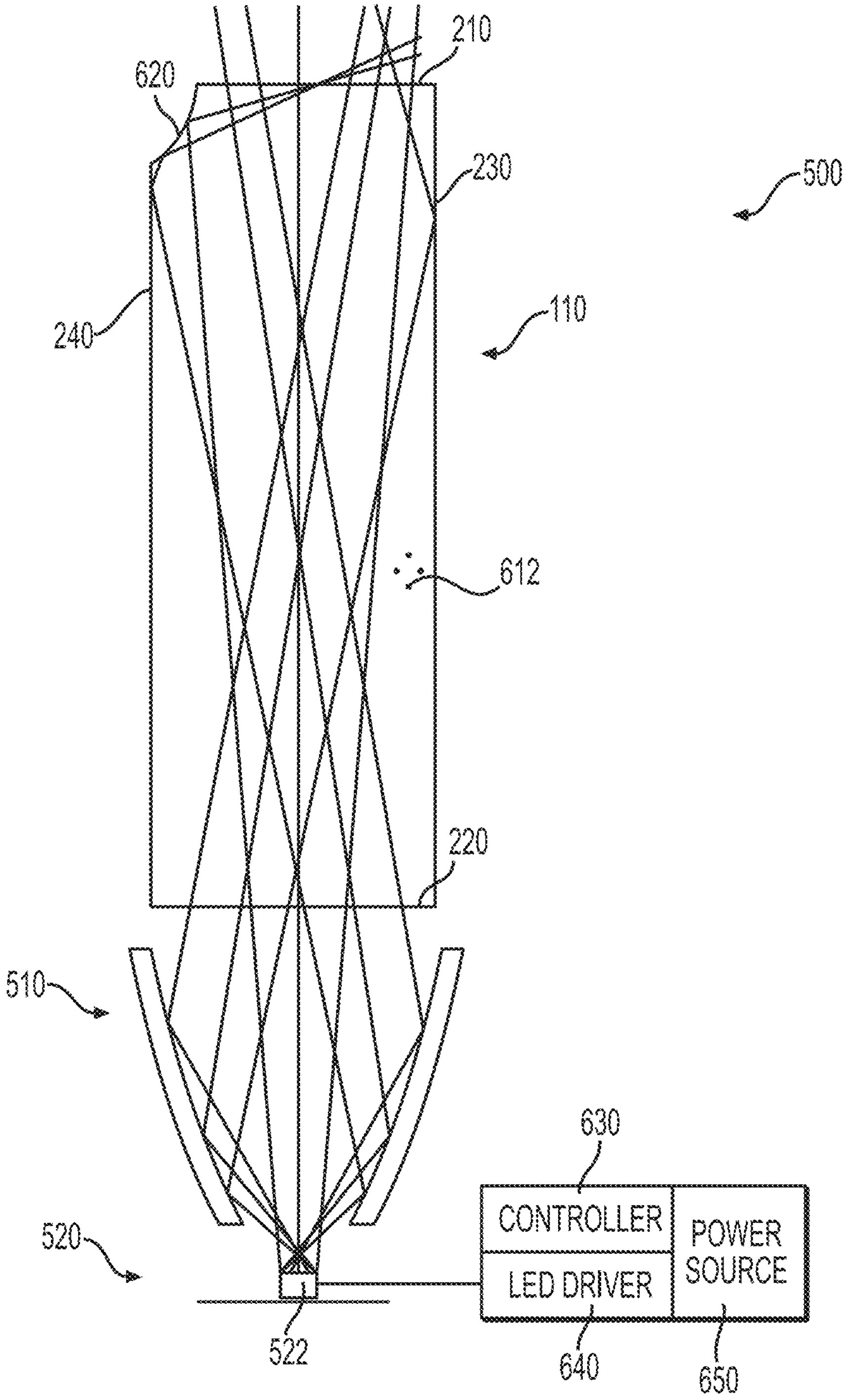
FIG. 6 is a schematic diagram of a lighting apparatus by which the present inventive concept can be embodied.

FIG. 6 is a schematic diagram of lighting system 500 in cross-section for purposes of explaining various features of the illustrated embodiment. As discussed above, light guide 110 has an exit face 210, an entrance face 220, an outboard side wall 230 and an inboard side wall 240. These surfaces enclose a volume of a light guide medium 610, such as a polycarbonate material, that has a refractive index relative to air to cause total internal reflection at the air/light guide interface. Additionally, light guide medium 610 may be tuned to the wavelength of the light source, e.g., LED 522, as described above. Alternatively or additionally, light guide medium 610 may be diffusive to produce a homogeneous lighting profile at exit face 210. In one embodiment, a light dispersive agent, such as minute/microscopic beads representatively illustrated at bead 612, may be distributed throughout the light guide medium 610 to introduce scattering centers therein. Beads 612 may be added in a manner by which light guide medium 610 is diffusive and such diffusivity is only apparent when illuminated by LEDs 522 (the material appears transparent to an observer otherwise, i.e., when not illuminated by LEDs 522). In one embodiment, the beads addition ratio is 10%.

In certain embodiments, a circular side cut 620 may be formed on the inboard side wall 240 and the exit face 210 and may have a radius of approximately 8 mm. This realizes a reflective surface internal to medium 610 by which light incident thereon is directed towards outboard side wall 230.

Reflector 510 may be pseudo-parabolic, i.e., having a cross-sectional profile similar to a parabola, yet having optical properties that differ from a true parabolic reflector. For example, as illustrated in FIG. 6, light rays impinging on reflector 510 from LED 522 may be directed to converge within medium 610 (while still being diffused by the protuberances and texturing described above), where the light rays would be parallel in a true parabolic reflector. The light convergence by the pseudo-parabolic reflector 510 ameliorates dark spots that would otherwise appear along the center of light guide 110.

Lighting apparatus 500 may be electrically coupled to vehicle resources to realize lighting animation, by which various LEDs 522 are switched on and off with specific relative timing with the on and off switching of other LEDs 522. For example, each of LEDs 522 may be cycled on and off sequentially by which it appears to an observer that a dark spot moves across the length of lighting apparatus 500 or, alternatively, a light spot moves across the length of lighting apparatus 500. More sophisticated animations may also be realized by suitable programming of a controller 630, such as to appear as a fluid within the light guide. Controller 630 may be electrically coupled to an LED driver 640 to control the current provided to LEDs 522. Controller 630 and LED driver 640 may obtain operating power from a power source 650, which may be realized by a battery, an alternator, or the like.

Figure 7:
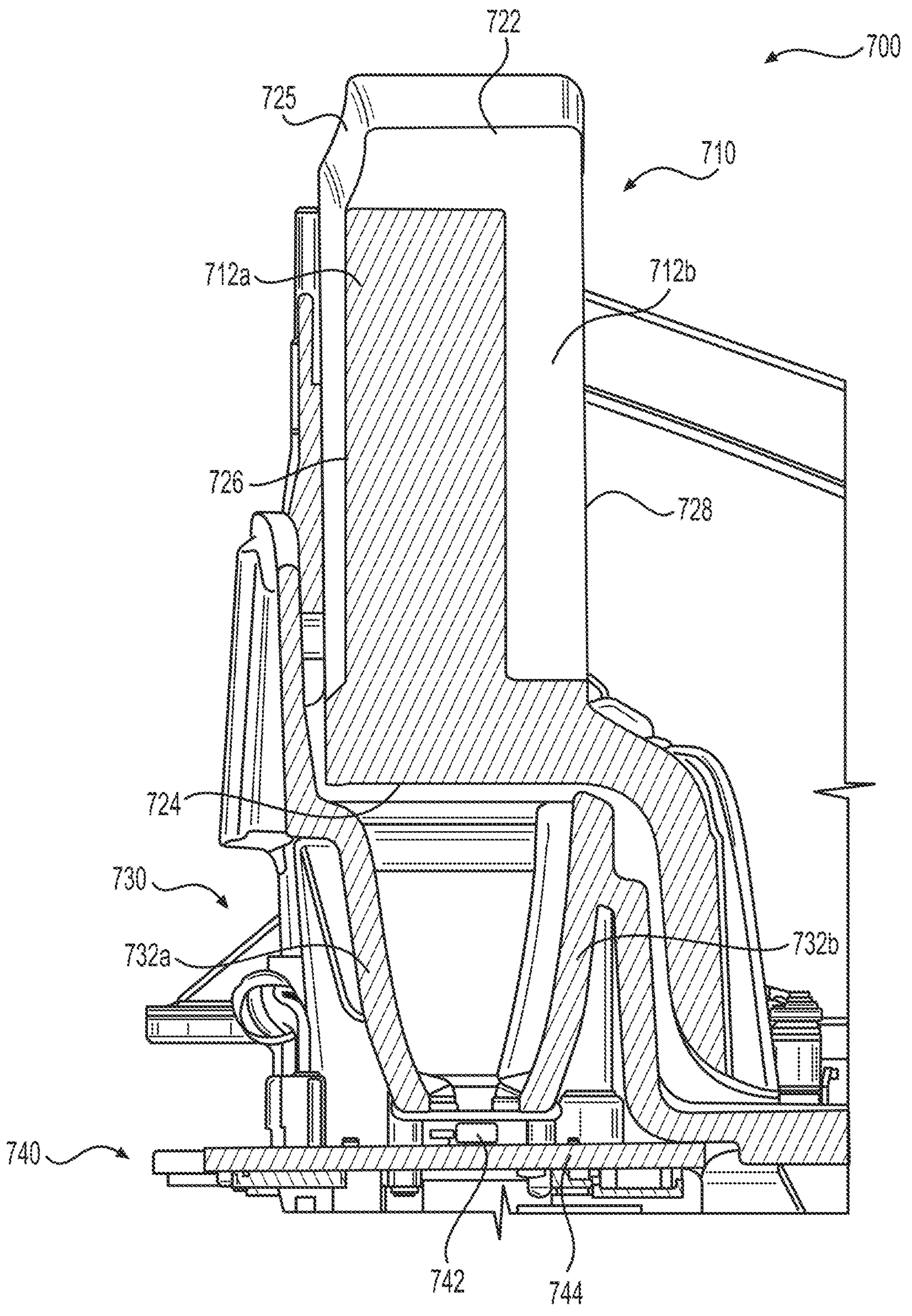
FIG. 7 is a cross-sectional view of a lighting apparatus by which the present invention can be embodied.

FIG. 7 is a cross-sectional view of a lighting apparatus 700 that implements features described with reference to lighting apparatus 500. Lighting apparatus 700 may include a light guide 710, a reflector 730 and light source 740, each of which cooperates with the others according to the principles described herein to produce a homogeneous light profile while meeting the photometric requirements for automotive lighting.

Light for lighting apparatus 700 may be provided by light source 740, which may be implemented by a plurality of LEDs 742 coupled to suitable circuitry on circuit board 744.

As is illustrated in FIG. 7, light guide 710 may be formed or otherwise constructed in two passes of an injection molding process. In the illustrated example, light guide 710 may include a first shot portion 712*a* and a second shot portion 712*b*, where such structure may be realized by a conventional two-shot over-molding process. Here, first shot portion 712*a* encompasses entrance face 724 and inboard side wall 726, and second shot portion 712*b* encompasses exit face 722 and outboard side wall 728 to include circular side cut 725. In some embodiments, first shot portion 712*a* may be formed from a clear medium, e.g., polycarbonate, and second shot portion 712*b* may be formed from a red medium, e.g., also the same polycarbonate but having dyes and other pigments added to tune the medium to the light source.

Lighting apparatus 700 may include pseudo-parabolic reflector 730 comprising a first reflector wall 732*a* and a second reflector wall 732*b*. As discussed above, pseudo-parabolic reflector 730 may be formed or otherwise constructed to direct light from LED 742 towards the center of light guide 710 so as to eliminate a central dark line that is otherwise present at exit face 722.

Figure 8:
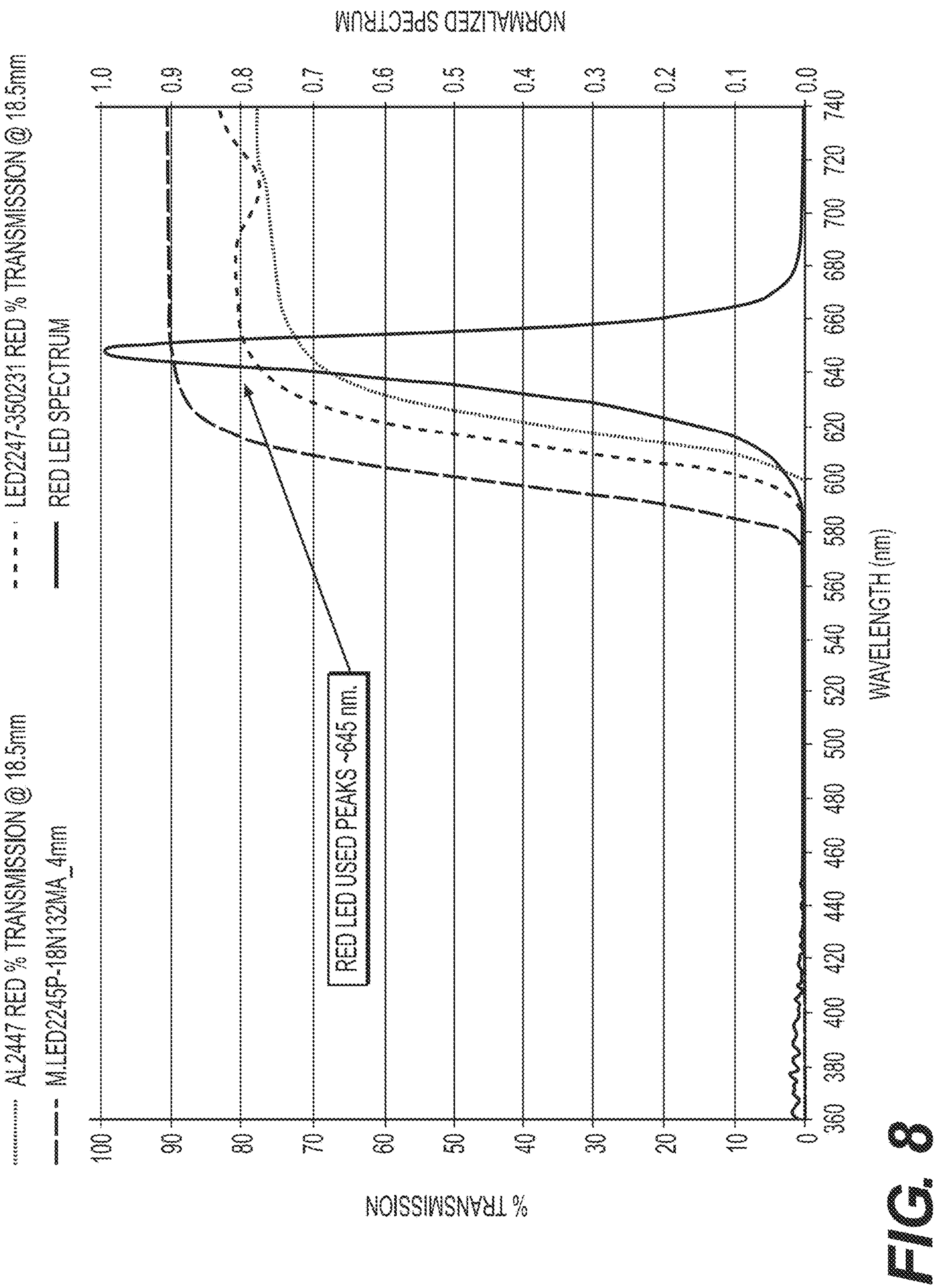
FIG. 8 is a graph of transmission curves of media by which the present invention can be embodied.

FIG. 8 is a graph of wavelength versus percent-transmission of various media that can be used to realize an embodiment of the present invention. A sample LED spectrum is illustrated in the figure as well (red spectrum at 675-740 nm). As is illustrated in the figure, embodiments of the present invention (the upper transmission curve) exhibit transmission characteristics that are more transmissive to red LED light, particularly the shade of red required by Society of Automotive Engineers (SAE) and Economic Commission for Europe (ECE) standards, than that used in other systems (lower transmission curves).

As used herein, the words "a", "an", and the like include a meaning of "one or more", unless stated otherwise. The drawings are generally drawn not to scale unless specified otherwise or illustrating schematic structures or flowcharts.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations in the present disclosure are possible in light of the above teachings. It is therefore to be understood that within the scope of the appended claims, the disclosure may be practiced otherwise than as specifically described herein.

What is claimed is:

1. A light guide of a vehicle comprising: an elongated body including: an entrance face at which light is admitted into the light guide, wherein the entrance face includes a pattern of protuberances that disperse light of a wavelength; an exit face at which the light emanates from the light guide, with the exit face being opposite the entrance face; an inboard side wall and an outboard side wall extending between the entrance and the exit face, with a sidewall distance in the inboard sidewall from the entrance face to the exit face being longer than a perpendicular distance between the inboard sidewall and the outboard sidewall in the exit face and with the entrance face, the exit face, the inboard side wall and the outboard side wall enclosing a medium that includes a colorant so that the medium meets a color criterion while the medium is minimally absorptive at the wavelength, wherein the colorant formed in the light guide includes a concentration by which the medium meets the color criterion and has a molar extinction coefficient that is a minimal value at the wavelength with respect to at least one other colorant by which the medium would meet the color criterion, and with substantially all the light travelling the sidewall distance.

2. The light guide of claim 1, wherein the medium comprises a polymeric material.

3. The light guide of claim 2, wherein the polymeric material has a melt flow index of 24-35 g/10 min.

4. The light guide of claim 1, wherein at least one of the entrance face and the exit face has a texture disposed thereon that disperses light.

5. The light guide of claim 1, wherein the medium comprises a first polymeric portion having a first photometric characteristic and a second polymeric portion having a second photometric characteristic.

6. The light guide of claim 1, further comprising a light dispersive agent in the medium that establishes light scattering centers throughout the medium or a portion of the medium.

7. An automotive lighting apparatus comprising:

a plurality of light sources that emits light at a predetermined wavelength;

a light guide comprising:

an elongated body spanning the light sources, the body including:

an entrance face at which the light from the light sources is admitted into the light guide, wherein the entrance face includes a pattern of protuberances that disperse light;

an exit face at which the light from the light sources emanates from the light guide, with the exit face being opposite the entrance face;

an inboard side wall and an outboard side wall extending between the entrance face and the exit face, with a sidewall distance in the inboard sidewall from the entrance face to the exit face being longer than a perpendicular distance between the inboard sidewall and the outboard sidewall in the exit face and with the entrance face, the exit face, the inboard side wall and the outboard side wall enclosing a medium that includes a colorant so that the medium meets a color criterion while the medium is minimally absorptive at the wavelength of the light sources, wherein the colorant formed in the light guide includes a concentration so that the medium meets the color criterion and has a molar extinction coefficient that is a minimal value at the wavelength of the light with respect to at least one other colorant by which the medium would meet the color criterion, with substantially all the light travelling the sidewall distance; and a reflector interposed between the light sources and the light guide, the reflector reflecting the light from the light sources to converge within the medium.

8. The apparatus of claim 7, wherein the medium comprises a polymeric material.

9. The apparatus of claim 8, wherein the polymeric material has a melt flow index of 24-35 g/10 min.

10. The apparatus of claim 7, wherein intensity of the light emanating from the exit face is homogeneous across the exit face.

11. The apparatus of claim 7, wherein either or both of the entrance face and the exit face has a texture disposed thereon that disperses the light from the light sources.

12. The apparatus of claim 7, wherein a first polymeric material and a second polymeric material are like polymeric materials and the first photometric characteristic is a color that is distinct than that of the second photometric characteristic.

13. The apparatus of claim 7, further comprising a light dispersive agent in the medium that establishes light scattering centers throughout the medium or a portion of the medium.

14. An automotive vehicle comprising:

an automotive lighting apparatus comprising:

a light guide comprising:

a plurality of light sources that emits light of a predetermined wavelength;

an elongated body spanning the light sources, the body including:

an entrance face at which the light from the light sources is admitted into the light guide wherein the entrance face includes a pattern of protuberances that disperses the light from the light sources;

an exit face, opposite to the entrance face, at which the light from the light sources emanates from the light guide;

an inboard side wall and an outboard side wall extending between the entrance face and the exit face, with a sidewall distance in the inboard sidewall from the entrance face to the exit face being longer than a perpendicular distance between the inboard sidewall and the outboard sidewall in the exit face and with the entrance face, the exit face, the inboard side wall, and the outboard side wall enclosing a medium that includes a colorant, wherein the colorant formed in said light guide includes a concentration so that the medium meets a color criterion and has a molar extinction coefficient that is a minimal value at the wavelength of the light with respect to at least one other colorant while the medium is minimally absorptive at the wavelength of the light sources, with substantially all the light travelling the sidewall distance; and a reflector interposed between the light sources and the light guide, the reflector reflecting the light from the light sources to converge within the medium.

15. The automotive vehicle of claim 14, wherein the medium comprises a polymeric material.

16. The automotive vehicle of claim 15, wherein the polymeric material has a melt flow index of 24-35 g/10 min.

17. The automotive vehicle of claim 14, wherein an intensity value of the light emanating from the exit face appears homogeneous across the exit face.

18. The automotive vehicle of claim 14, wherein either or both of the entrance face and the exit face has a texture disposed thereon that disperses the light from the light sources.

19. The automotive vehicle of claim 14, wherein a first polymeric material and a second polymeric material are like polymeric materials and the first photometric characteristic is a color that is distinct than that of the second photometric characteristic.

20. The automotive vehicle of claim 14, further comprising a light dispersive agent in the medium that establishes light scattering centers throughout the medium or a portion of the medium.

* * * * *